United States Patent
Fukuta et al.

(10) Patent No.: US 6,742,424 B2
(45) Date of Patent: Jun. 1, 2004

(54) CUTTING APPARATUS FOR CERAMIC GREEN BODIES

(75) Inventors: Ken Fukuta, Ama-gun (JP); Yuji Ueda, Nagoya (JP); Satoshi Sugiyama, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/330,130

(22) Filed: Dec. 30, 2002

(65) Prior Publication Data

US 2003/0089214 A1 May 15, 2003

Related U.S. Application Data

(62) Division of application No. 09/432,604, filed on Nov. 3, 1999, now Pat. No. 6,520,061.

(30) Foreign Application Priority Data

Nov. 5, 1998 (JP) ............................................. 10-314625

(51) Int. Cl.$^7$ .............................. B26D 1/46; B26D 1/547
(52) U.S. Cl. ............................. 83/13; 83/651.1; 83/784; 83/307.2; 83/954; 83/794; 125/21; 125/16.02
(58) Field of Search .................... 125/12, 21, 16.02; 83/13, 651.1, 307.1, 307.2, 307.3, 286, 753, 783, 784, 788, 794, 797, 813, 284, 285, 296, 356.2, 785, 647, 786, 756, 647.5, 758, 548, 781, 624, 954, 581.1

(56) References Cited

U.S. PATENT DOCUMENTS 4,238,081 A 12/1980 Kovic et al. ............. 242/47.01
4,484,502 A 11/1984 Ebner ........................ 83/651.1
4,494,523 A 1/1985 Wells .................... 83/651.1 X
4,528,883 A 7/1985 Goransson et al. ........... 83/870
4,702,138 A 10/1987 Hattori et al. ................ 83/785
5,628,301 A * 5/1997 Katamachi ................... 125/21
5,865,162 A 2/1999 Kambe et al. ........... 125/16.02
5,890,481 A 4/1999 Bigelow .................. 125/16.02
6,006,737 A 12/1999 Hayashi et al. .......... 125/16.02
6,520,061 B2 * 2/2003 Fukuta et al. ............. 83/651.1

FOREIGN PATENT DOCUMENTS

| DE | 197 29 141 | 1/1998 |
| GB | 2 084 918 | 4/1982 |
| JP | 49-83087 | 8/1974 |
| JP | 61237604 | 10/1986 |
| JP | 62157769 | 7/1987 |
| JP | 10034639 | 2/1998 |

* cited by examiner

Primary Examiner—Boyer D. Ashley
(74) Attorney, Agent, or Firm—Parkhurst & Wendel, L.L.P.

(57) ABSTRACT

An apparatus for cutting green ceramic bodies, includes a traveling path for green ceramic bodies, beds for supporting green ceramic bodies at constant intervals in series along the traveling path, an arm on each side of the traveling path, two drive portions for moving respective arms perpendicularly relative to the traveling path, a drive portion for moving both arms in the same direction as the traveling path, a wire for cutting green ceramic bodies, extending between the arms, and wire supporting portions, on respective arms. Each wire supporting portion includes a servo motor with an axis of rotation, a magnet member around the axis of rotation, a bobbin having a conical surface around which wire is wound, and magnetically coupled to the axis of rotation by the magnet member, and a traversing mechanism for varying the position where the wire is wound around the length of the conical surface.

6 Claims, 6 Drawing Sheets n cycles (n+1) cycles

CUTTING APPARATUS FOR CERAMIC GREEN BODIES

This application is a divisional of application Ser. No. 09/432,604 filed Nov. 3, 1999, now now U.S. Pat. No. 6,520,061.

BACKGROUND OF THE INVENTION

1. Field of the Invention

The present invention relates to a cutting apparatus for ceramic green bodies, which are soft and easily deformable, such as formed bodies of ceramic honeycomb structural bodies.

2. Description of Related Art

Generally, as a cutting apparatus for cutting the ceramic green bodies such as ceramic honeycomb structural bodies, the cutting apparatuses having various constructions have been known. As an example, the applicant disclosed, in JP-B-4-60402 (U.S. Pat. No. 4,702,138), the cutting apparatus for ceramic green honeycomb structural bodies in which generations of deformation and fracture of the ceramic green honeycomb structural bodies can be prevented by using "draw-cut" operation.

FIG. 9 is a schematic view showing the cutting apparatus for ceramic green honeycomb structural bodies mentioned above which have been proposed previously by the applicant. In the embodiment shown in FIG. 9, a cutting apparatus 51 has a following construction. Two arms 53-1 and 53-2 are arranged in a widthwise direction of a ceramic green honeycomb structural body 52. A fine wire 54 used for a cutting operation is extended between the arms 53-1 and 53-2 via rollers 55 arranged to the arms 53-1 and 53-2, and ends of the fine wire 54 extended between the two rollers 55 is cut into the ceramic green honeycomb structural body 52, while the arms 53-1 and 53-2 are moved in a cutting direction of the ceramic green honeycomb structural body 52 by means of an arm moving mechanism (not shown). When the arms 53-1 and 53-2 are moved in the cutting direction of the ceramic green honeycomb structural body 52 and the fine wire 54 for the cutting operation cuts the ceramic green honeycomb structural body 52, at least one operation such that the fine wire 54 is pulled toward one roller 55 side and then pulled toward the other roller 55 side is performed by a fine wire reciprocating mechanism 57.

In the cutting apparatus mentioned above, it is possible to cut rapidly the soft and otherwise easily deformed body, such as a ceramic green body, without deformation. However, since, in the case of cutting the ceramic green body, a portion of the fine wire 54 used for cutting is always same, there is a drawback such that a life of the fine wire 54 is short and thus it is necessary to exchange the fine wire 54 frequently. Moreover, since there is a portion for connecting the spring 56 and the fine wire 54 and further since it is necessary to extend the fine wire 54 via a plurality of rollers 55, there is a drawback such that an exchanging operation of the fine wire 54 is troublesome.

SUMMARY OF THE INVENTION

An object of the invention is to eliminate the drawbacks mentioned above and to provide a cutting apparatus for ceramic green bodies in which an exchanging interval of a fine wire for cutting can be long so that a life of the fine wire can be long and in which an exchanging operation of the fine wire is easy.

According to the invention, a cutting apparatus for cutting ceramic green bodies comprising; a traveling path for traveling a ceramic green body; supporting beds for supporting the ceramic green body arranged on the traveling path with a constant interval; a pair of first arm and second arm arranged movably in a traveling direction of the ceramic green body, which are provided at both side ends of the traveling path, a first drive portion and a second drive portion for moving the first arm and the second arm respectively upward or downward, which are provided to the first arm and the second arm respectively; a fine wire for cutting the ceramic green body extended between the first arm and the second arm; a first fine wire supporting portion and a second fine wire supporting portion for moving the fine wire for cutting the ceramic green body from one side to the other under constant tension, when the fine wire traverses the ceramic green body by moving the first and second anus in a cutting direction of the ceramic green body. The arms are driven by the first and second drive portions; and a third drive portion for moving the first and second arms in the same direction as the traveling direction of the ceramic green body.

In the present invention, the first fine wire supporting portion and a second fine wire supporting portion move the fine wire for cutting the ceramic green body, which extends between the first arm and the second arm, from one side to the other under constant tension. Therefore, when the fine wire traverses the ceramic green body by moving the first and second arms in a cutting direction of the ceramic green body, which are driven by the first and second drive portions, a portion of the fine wire used for cutting differs so that such a portion of the fine wire is used only for a few cutting operations at most, and the fine wire is not broken during the cutting operation. By utilizing preferable following techniques such as (1) the cutting operation is performed by moving the fine wire for cutting the ceramic green body from one side to the other side of the first and second arms, (2), in the case of (1) mentioned above, a moving direction of the fine wire from one side to the other side is reversed every cutting operations, (3) the cutting operation is performed by moving the fine wire reciprocally in both directions, and (4), in the cases of (1)–(3) mentioned above, a traveling speed of the fine wire is changed between traveling from the first arm to the second arm and traveling from the second arm to the first arm. In this manner, it is possible to achieve a long life of the fine wire.

DESCRIPTION OF THE PREFERRED EMBODIMENT

Figure 1:
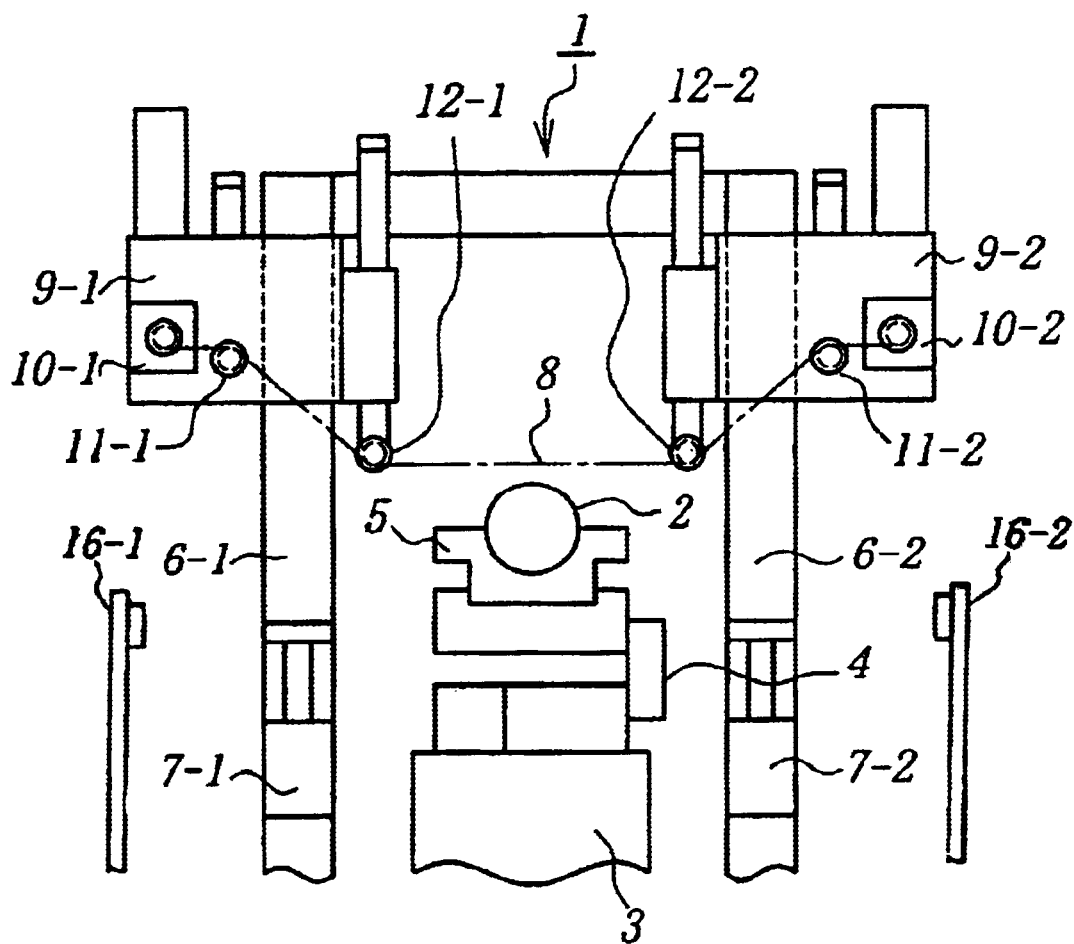
FIG. 1 is a schematic view showing one embodiment of a cutting apparatus for ceramic green bodies according to the invention.

FIG. 1 is a schematic view showing one embodiment of a cutting apparatus for ceramic green bodies according to the invention. In the embodiment shown in FIG. 1, a cutting apparatus for ceramic green bodies 1 according to the invention comprises a traveling path 4 arranged on a base 3 for traveling a ceramic green body 2 in a vertical direction with respect to a sheet plane of the figure and supporting beds 5 for supporting the ceramic green body 2 which are arranged on the traveling path 4 with a constant interval through which a cutting means is passed. Moreover, a pair of first and second anus, 6-1 6-2 arranged movably in a traveling direction of the ceramic green body 2 are provided at both side ends of the traveling path 4. Further, a first drive portion 7-1 and a second drive portion 7-2 constituted by for example a servo motor for moving the first arm 6-1 and the second arm 6-2 respectively upward or downward by means of for example a bolt screw construction are provided to the first arm 6-1 and the second arm 6-2 respectively.

Figure 2:
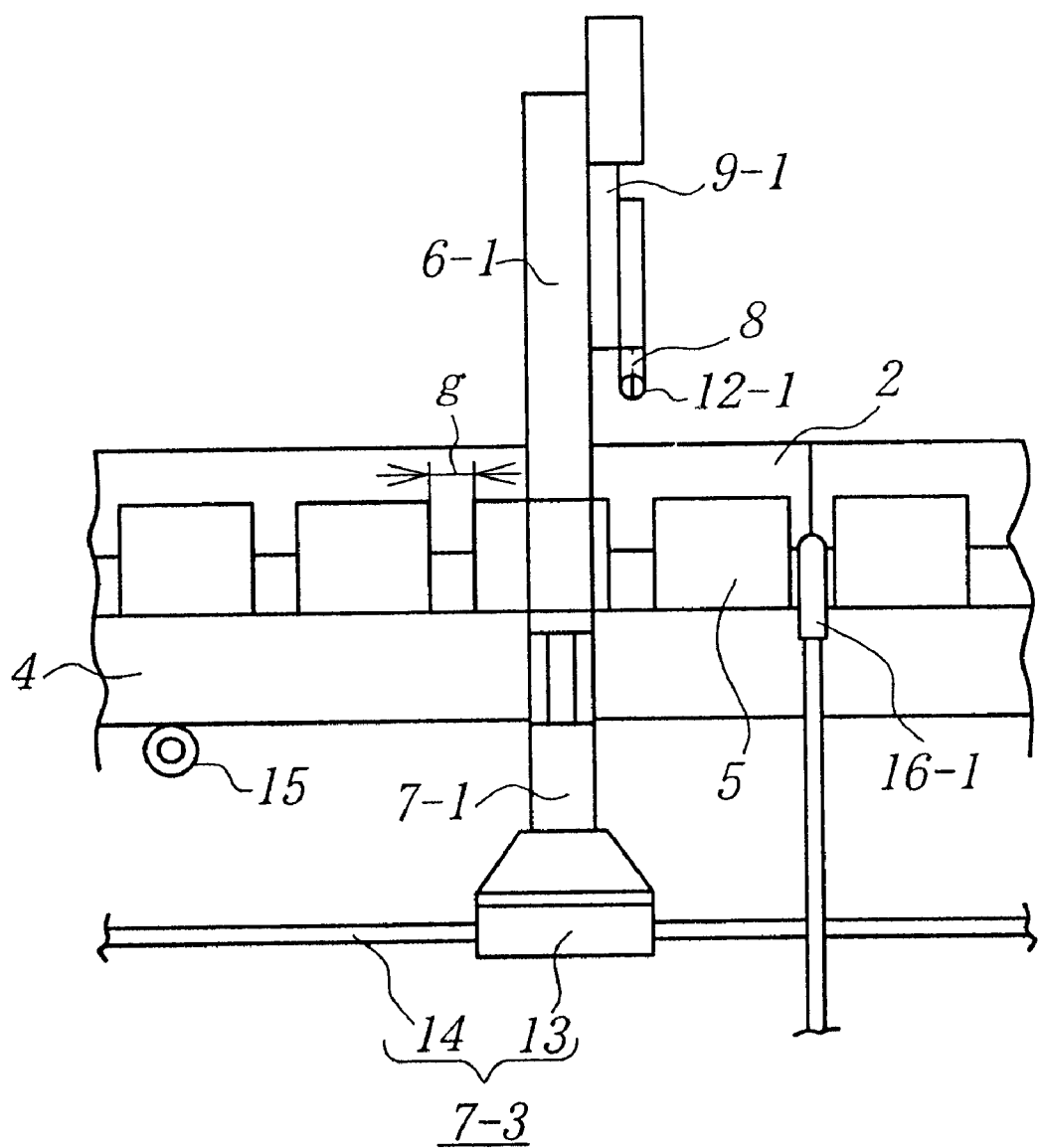
FIG. 2 is a side view illustrating the cutting apparatus shown in FIG. 1.

FIG. 2 is a side view illustrating the cutting apparatus shown in FIG. 1. In the cutting apparatus 1 according to the 7 invention, as shown in FIG. 2, a third drive portion 7-3 comprising for example a servo motor 13 and a bolt screw 14 used for moving the first arm 6-1 and the second arm 6-2 in the same direction as the traveling direction of the ceramic green body 2 is provided. Moreover, a rotary encoder 15 is provided to the traveling path 4, and a traveling speed of the traveling path 4 i.e. a traveling speed of the ceramic green body 2 is detected by the rotary encoder 15. Further, a pair of photoelectric switches 16-1 and 16-2 are provided at both side ends of the traveling path 4, and a gap g between the supporting beds 5 is detected by the pair of the pair of photoelectric switches 16-1 and 16-2. The photoelectric switches 16-1 and 16-2 are positioned apart from the fine wire 8 by a distance from one gap g to the next gap g as shown in FIG. 2, and thus it is possible to determine that the position at which the photoelectric switches 16-1 and 16-2 detect the gap g is a cutting position of the ceramic green body 2 by means of the fine wire 8.

Figure 3A:
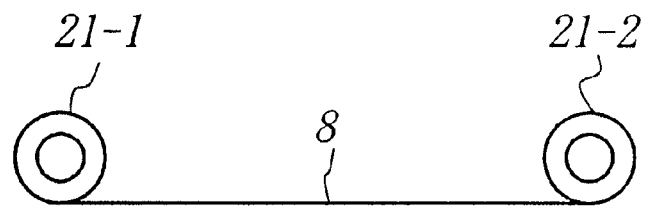
FIGS. 3a and 3b are schematic views respectively explaining a fine wire extending method in the cutting apparatus according to the invention.

FIG. 3 is a schematic view explaining a method of extending the fine wire 8. In the present invention, when the fine wire 8 is to be extended between the first fine wire supporting portion 10-1 and the second fine wire supporting portion 10-2, a fine wire winding body in which the fine wire 8 is rewound around a first bobbin 21-1 and a second bobbin 21-2 is previously prepared as shown in FIG. 3a. Before the fine wire winding body is set in the cutting apparatus 1, one end of the fine wire 8 exists in one bobbin for example the first bobbin 21-1, and substantially all of the fine wire 8 including the other end thereof exists in the other bobbin i.e. the second bobbin 21-2 in this case. Then, a plurality of the fine wire winding bodies in which the fine wire 8 is rewound around the first bobbin 21-1 and the second bobbin 21-2 are prepared, and the thus prepared fine wire winding body is set to the cutting apparatus 1 every exchanging operations of the fine wires 8.

Figure 3B:
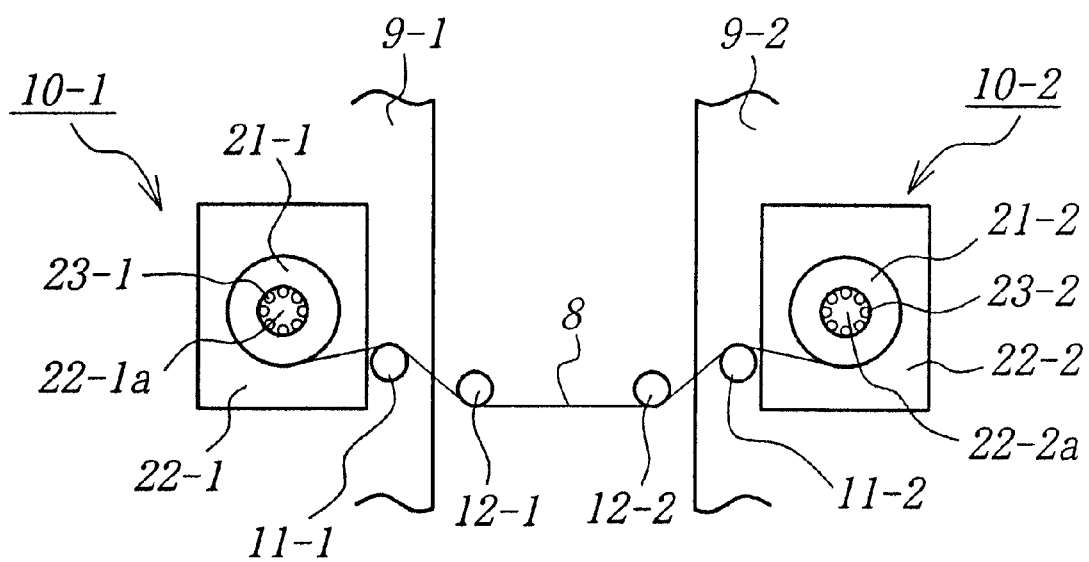

A setting operation of the fine wire winding body shown in FIG. 3a is as follows. That is to say, as shown in FIG. 3b, the first bobbin 21-1 and the second bobbin 21-2 of the fine wire winding body are respectively connected and fixed to rotation axes 22-1a and 22-2a of a first servo motor 22-1 and a second servo motor 22-2 respectively constructing the first fine wire supporting portion 10-1 and the second fine wire supporting portion 10-2. The connecting/fixing operation mentioned above is performed by connecting and fixing the first bobbin 21-1 and the second bobbin 21-2 both made of metal to the rotation axes 22-1a and 22-2a by means of a first magnet 23-1 and a second magnet 23-2 arranged to the rotation axes 22-1a and 22-2a. In this case, the fine wire 8 is extended in such a manner that the fine wire 8 is passed upward of the first and second traversing mechanisms 11-1 and 11-2 and is passed downward of the first and second fixed rollers 12-1 and 12-2.

In the embodiment shown in FIG. 3, the first fine wire supporting portion 10-1 is constructed by the first bobbin 21-1, the first servo motor 22-1 and the first magnet 23-1 and the second fine wire supporting portion 10-2 is constructed by the second bobbin 21-2, the second servo motor 22-2 and the second magnet 23-2.

Figure 4A:
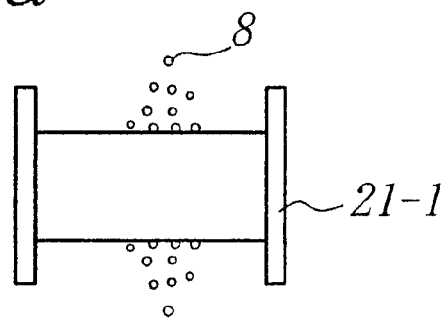
FIGS. 4a and 4b are schematic views respectively explaining a movement of a traversing mechanism in the cutting apparatus according to the invention.
Figure 4B:
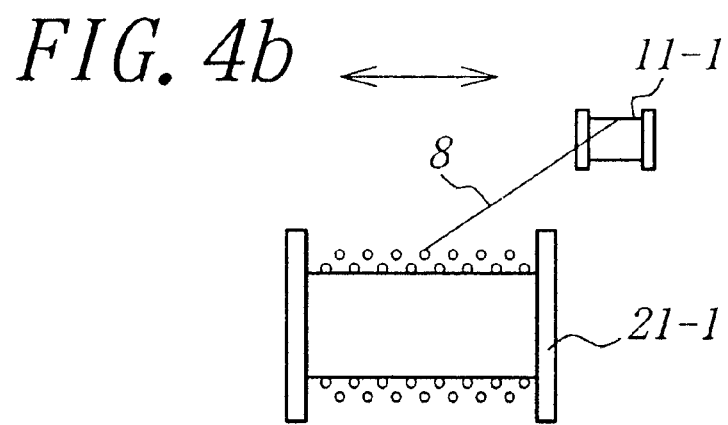

FIGS. 4a and 4b are schematic views respectively explaining a movement of a traversing mechanism. In the present invention, the first traversing mechanism 11-1 and the second traversing mechanism 11-2 are provided to the first bobbin 21-1 and the second bobbin 21-2 respectively. At first, as shown in FIG. 4a, if the fine wire 8 is to be rewound around the first bobbin 21-1 under the condition such that no first traversing mechanism 11-1 is provided, the fine wire 8 is plunged in a pile up portion of the fine wires 8 so that the fine wires 8 are intertwisted and rubbed with each other, and, in an extreme case, the fine wire 8 is broken. The first traversing mechanism 11-1 is used for solving this problem. That is to say, when the fine wire 8 is rewound around the first bobbin 21-1, the first traversing mechanism 11-1 is moved rightward and leftward with respect to the first bobbin 21-1 as shown in FIG. 4b. In this case, a rewinding position of the fine wire 8 in the first bobbin 21-1 can be varied continuously, and thus it is possible to prevent a plunging and intertwisting of the fine wire 8 by aligning the fine wire 8 in the first bobbin 21-1. This is just the same as a spinning mechanism of a reel in fishing. A movement of the second traversing mechanism 11-2 is the same as that of the first traversing mechanism 11-1 mentioned above.

Then, cutting methods of the ceramic green body 2 using the fine wire 8 will be explained with reference to FIGS. 5–8. In the cutting apparatus 1 according to the invention, a basis of cutting the ceramic green body 2 by using the fine wire 8 is that the first arm 6-1 and the second arm 6-2 are moved in the cutting direction of the ceramic green body 2 by driving the first drive portion 7-1 and the second drive portion 7-2 and the fine wire 8 traverses the ceramic green body 2. In the basic cutting mentioned above, the fine wire 8 can be moved in various manners.

Figure 5:
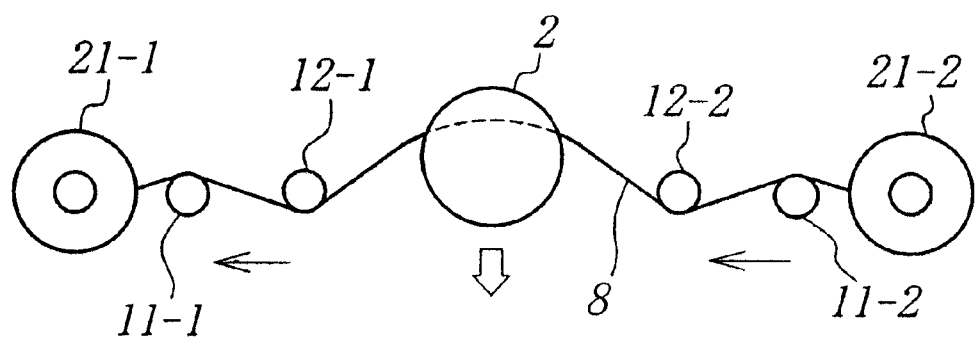
FIG. 5 is a schematic view explaining one embodiment of a cutting operation in the cutting apparatus according to the invention.

FIG. 5 is a schematic view explaining one embodiment of the cutting method in the cutting apparatus 1 according to the invention. In the embodiment shown in FIG. 5, the cutting operation is performed by moving the fine wire 8 from one side to the other side. That is to say, as shown in FIG. 5, during a downward movement of the fine wire 8 across the ceramic green body 2, the fine wire 8 is moved at a constant speed from the second bobbin 21-2 to the first bobbin 21-1.

Figure 6A:
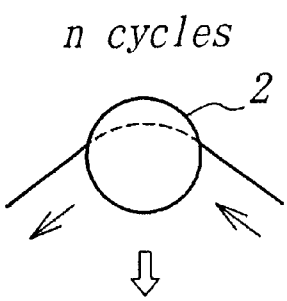
FIGS. 6a and 6b are schematic views respectively explaining another embodiment of the cutting method in the cutting apparatus according to the invention.
Figure 6B:
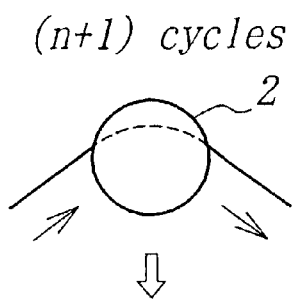

FIGS. 6a and 6b are schematic views respectively explaining another embodiment of the cutting method in the cutting apparatus 1 according to the invention. In the embodiment shown in FIGS. 6a and 6b, a moving direction of the fine wire 8 from one side to the other side is reversed every cutting operations. That is to say, as shown in FIG. 6a, at an n cycle cutting operation, the fine wire 8 is moved at a constant speed from the second bobbin 21-2 to the first bobbin 21-1 during a downward movement of the fine wire 8 across the ceramic green body 2. Then, as shown in FIG. 6b, at an n+1 cycle cutting operation, the fine wire 8 is moved at a constant speed by the same distance as that of the n cycle cutting operation from the first bobbin 21-1 to the second bobbin 21-2 during a downward movement of the fine wire 8 across the ceramic green body 2. In the cutting method shown in FIGS. 6a and 6b, since the cutting operation is performed always by using the same part of the fine wire 8, the part of the fine wire 8 used for the cutting operation is exchanged by moving it to a new part which is not used in a previous cutting operation when the number of the cutting operations reaches to the predetermined maximum number, and the cutting operation is restarted by using the new part of the fine wire 8.

Figure 7:
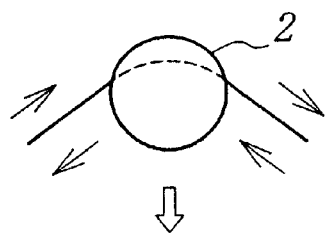
FIG. 7 is a schematic view explaining still another embodiment of the cutting method in the cutting apparatus according to the invention.

FIG. 7 is a schematic view explaining still another embodiment of the cutting method of the cutting apparatus 1 according to the invention. In the embodiment shown in FIG. 7, the cutting operation is performed by moving the fine wire reciprocally in both directions. That is to say, as shown in FIG. 7, during a downward movement of the fine wire 8 across the ceramic green body 2, a movement of the fine wire 8 from the second bobbin 21-2 to the first bobbin 21-1 and a movement of the fine wire 8 from the first bobbin 21-1 to the second bobbin 21-2 are reciprocated in one cutting operation. Also in the cutting method shown in FIG. 7, as is the same as the cutting method shown in FIG. 6, a part of the fine wire 8 used for the cutting operation is exchanged to a new part thereof reaches to the predetermined maximum number, and the cutting operation is restarted by using the new part of the fine wire 8.

The cutting methods shown in FIGS. 5–7 can be suitably selected corresponding to hardness, shape and so on of the ceramic green body 2 to be cut. In each cases, when the fine wire 8 is completely rewound from one bobbin to the other bobbin, the fine wire winding body in which the new fine wire 8 is rewound around the first bobbin 21-1 and the second bobbin 21-2 is exchanged to new one. Moreover, in each cases, if a traveling speed of the fine wire 8 in one direction is varied from that in the other direction when the ceramic green body 2 is cut by using the fine wire 8, a part of the fine wire 8 used for the cutting operation is not always same, and is used for a few cutting operations at best. In this case, the fine wire 8 is not broken during the cutting operation, and thus a long life of the fine wire 8 can be achieved. The cutting methods shown in FIGS. 5–7 can be performed in such a manner that the first servo motor 22-1 and the second servo motor 22-2 are provided to the first fine wire supporting portion 10-1 and the second wire supporting portion 10-2 respectively, and that the first servo motor 22-1 and the second servo motor 22-2 are driven respectively.

Figure 8:
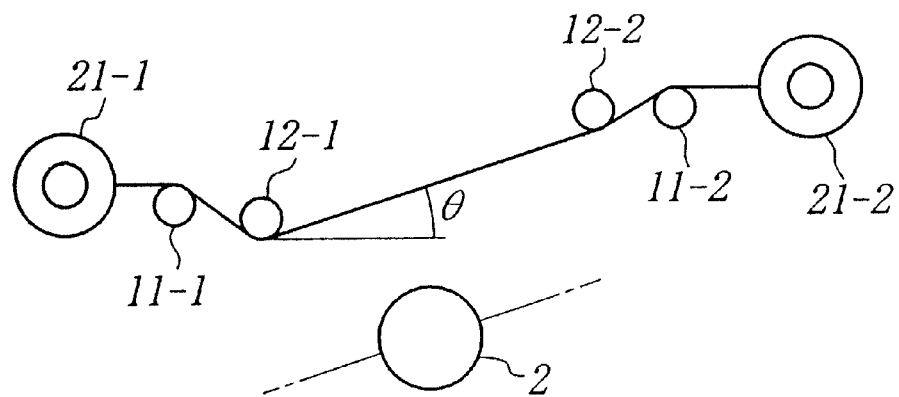
FIG. 8 is a schematic view explaining still another embodiment of the cutting method in the cutting apparatus according to the invention.
Figure 9:
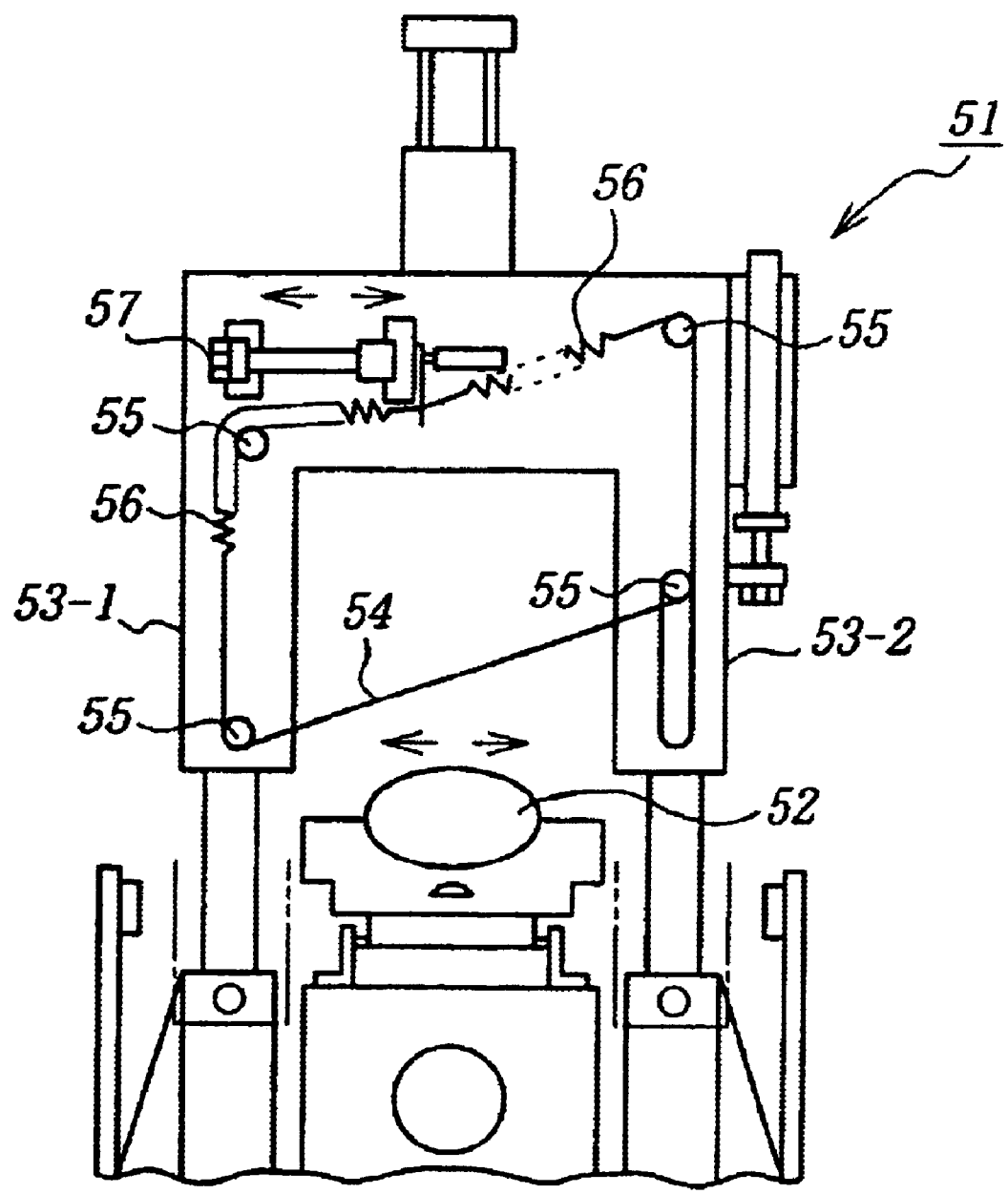
FIG. 9 is a schematic view showing one embodiment of a known cutting apparatus for ceramic green bodies.

FIG. 8 is a schematic view showing still another embodiment of the cutting method in the cutting apparatus according to the invention. In the embodiment shown in FIG. 8, the fine wire 8 is inclined at an angle $\theta$ with respect to a horizontal direction and the cutting operation is performed in such a manner that the fine wire 8 has a cutting angle $\theta$ with respect to the ceramic green body 2 to be cut. This cutting operation mentioned above is preferred since crashes and defects due to vacuum processes of the ceramic green body 2 can be reduced. The cutting method shown in FIG. 8 can be performed in such a manner that the first drive portion 7-1 and the second drive portion 7-2 are provided to the first arm 6-1 and the second arm 6-2 respectively, and that the first drive portion 7-1 and the second drive portion 7-2 are driven respectively.

The cutting operation of the ceramic green body 2 in the cutting apparatus 1 having the construction mentioned above is as follows. At first, the fine wire 8 stands by at an upper home position as shown in FIGS. 1–2. Under such a condition, the ceramic green body 2 is moved in a traveling direction by means of the traveling path 4. Then, when the gap g between the supporting beds 5 is detected by means of the photoelectric switches 16-1 and 16-2, the first drive portion 7-1 and the second drive portion 7-2 are driven. By driving the first drive portion 7-1 and the second drive portion 7-2, a downward movement of the fine wire 8 is started. Then, the cutting operation is performed by traversing the fine wire 8 across the ceramic green body 2. In this case, a position of the fine wire 8 in the traveling direction is controlled by driving the third drive portion 7-3 in such a manner that the fine wire 8 is moved at the same speed as that of the traveling of the traveling path 4 which is detected by the rotary encoder 15. In this manner, since the fine wire 8 can be always traversed vertically with respect to the ceramic green body 2 during the cutting operation, it is possible to cut the ceramic green body 2 in a vertical direction. It is a matter of course that various movements of the fine wire 8 mentioned above are performed during the cutting operation.

As is clearly understood from the above explanations, according to the invention, since the fine wire for cutting the ceramic green body, which is extended between the first arm and the second arm, is moved from one side to the other side with a constant tension by means of the first fine wire supporting portion and the second fine wire supporting portion, a portion of the fine wire used for cutting is not-always same so that such a portion of the fine wire is used only for a few cutting operations, and the fine wire is not broken during the cutting operation. In this manner, it is possible to achieve a long life of the fine wire.

What is claimed is:

1. A method for cutting a green ceramic body comprising:

providing an apparatus for cutting green ceramic bodies, said apparatus comprising:

a traveling path for green ceramic bodies;

supporting beds for supporting green ceramic bodies located at constant intervals in series along the traveling path;

first and second arms, one on each side of the traveling path, the arms movable adjacent to the path for allowing green ceramic bodies to pass between the arms;

first and second drive portions for moving respective first and second arms perpendicularly relative to the traveling path;

a third drive portion for moving both arms in the same direction as the traveling path;

first and second fine wire supporting portions on respective arms, each fine wire supporting portion having a servo motor with an axis of rotation-r a magnet member around the axis of rotation;

a plurality of interchangeable and previously prepared fine wire winding bodies having a first rotatable bobbin, a second rotatable bobbin, and a fine wire having first and second ends, wherein each end of the fine wire is wrapped around a conical surface of one of the bobbins, said winding bodies mountable to, and dismountable from, the apparatus as a unit structure, wherein each bobbin is magnetically coupled for rotation about a respective axis of rotation by a respective magnet member, and said first and second ends of the wire extending between the arms for cutting a green ceramic bodies; and a traversing mechanism for varying a position where the fine wire is wound around the conical surface throughout the axial length of the conical surface; and moving the fine wire lengthwise for cutting a green ceramic body located between the arms.

2. The method of claim 1, wherein the fine wire moves lengthwise reciprocally in both directions.

3. The method of claim 1, wherein the fine wire moves from first to second arm at a different speed than from second to first arm.

4. The method of claim 1, where wherein substantially all of the fine wire is wrapped around one bobbin to define a used wire bobbin, and then the used wire bobbin is replaced with a bobbin comprising unused fine wire.

5. The method of claim 1, wherein the fine wire moves from the first arm to the second arm.

6. The method of claim 5, wherein after the fine wire performs a cutting operation, the lengthwise movement of the fine wire is reversed in direction.

* * * * *